(12) United States Patent
Willi et al.

(10) Patent No.: US 7,007,669 B1
(45) Date of Patent: Mar. 7, 2006

(54) DISTRIBUTED IGNITION METHOD AND APPARATUS FOR A COMBUSTION ENGINE

(75) Inventors: Martin L. Willi, Dunlap, IL (US); Brett M. Bailey, Peoria, IL (US); Scott B. Fiveland, East Norwich, NY (US); Weidong Gong, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/003,537

(22) Filed: Dec. 3, 2004

(51) Int. Cl.
*F02B 17/00* (2006.01)

(52) U.S. Cl. ...................... 123/430; 123/305

(58) Field of Classification Search ............... 123/430, 123/431, 1 A, 575, 304, 305, 299
See application file for complete search history.

(56) References Cited

U.S. PATENT DOCUMENTS

| | | | |
|---|---|---|---|
| 5,870,978 | A | 2/1999 | Willi et al. |
| 6,032,617 | A | 3/2000 | Willi et al. |
| 6,095,102 | A | 8/2000 | Willi et al. |
| 6,202,601 | B1 | 3/2001 | Ouellette et al. |
| 6,286,482 | B1 | 9/2001 | Flynn et al. |
| 6,463,907 | B1 | 10/2002 | Hiltner |
| 6,467,495 | B1 | 10/2002 | Shost |
| 6,484,689 | B1 | 11/2002 | Hasegawa |
| 6,516,782 | B1 | 2/2003 | Thomas |
| 6,666,185 | B1 | 12/2003 | Willi et al. |
| 2003/0101963 | A1 | 6/2003 | Esteghlal et al. |
| 2003/0168037 | A1 * | 9/2003 | zur Loye et al. ........... 123/295 |
| 2004/0149255 | A1 * | 8/2004 | zur Loye et al. ........... 123/295 |
| 2005/0011485 | A1 * | 1/2005 | Ryan et al. ................. 123/295 |

OTHER PUBLICATIONS

SAE 9935761, "A New Combustion Concept for Internal Combustion Engines", pp 413-418, P. Higelin, C. Robinet, C. Mounaim-Rouselle, O. Pajot, and B. Moreau, Laboratoire de Mecanique et Energetique-Universite d'Orleans.

* cited by examiner

Primary Examiner—John T. Kwon

(57) ABSTRACT

A method and apparatus for operating an internal combustion engine is provided. The method comprises the steps of introducing a primary fuel into a main combustion chamber of the engine, introducing a pilot fuel into the main combustion chamber of the engine, determining an operating load of the engine, determining a desired spark plug ignition timing based on the engine operating load, and igniting the primary fuel and pilot fuel with a spark plug at the desired spark plug ignition timing. The method is characterized in that the octane number of the pilot fuel is lower than the octane number of the primary fuel.

12 Claims, 3 Drawing Sheets

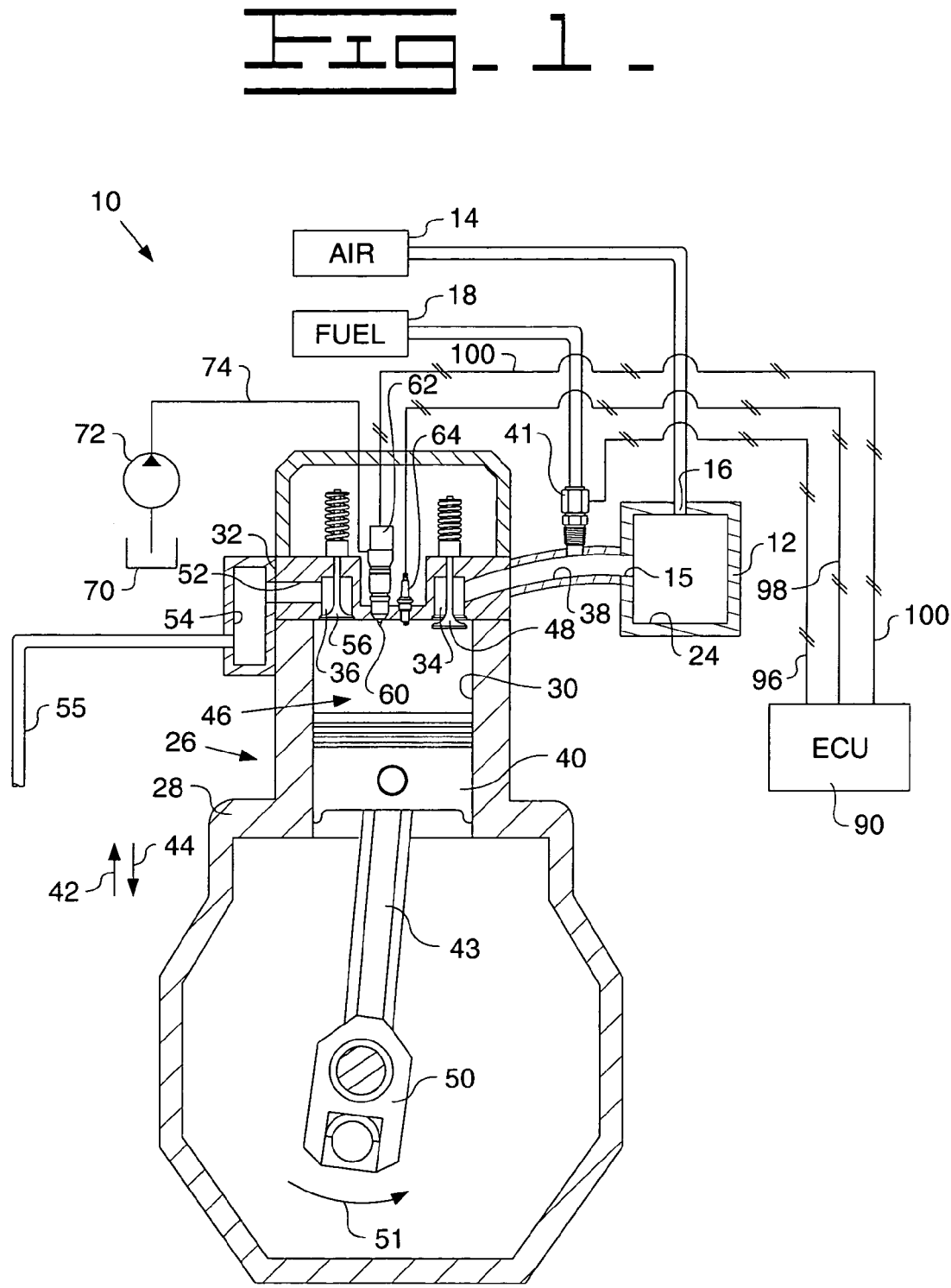
Fig_1_

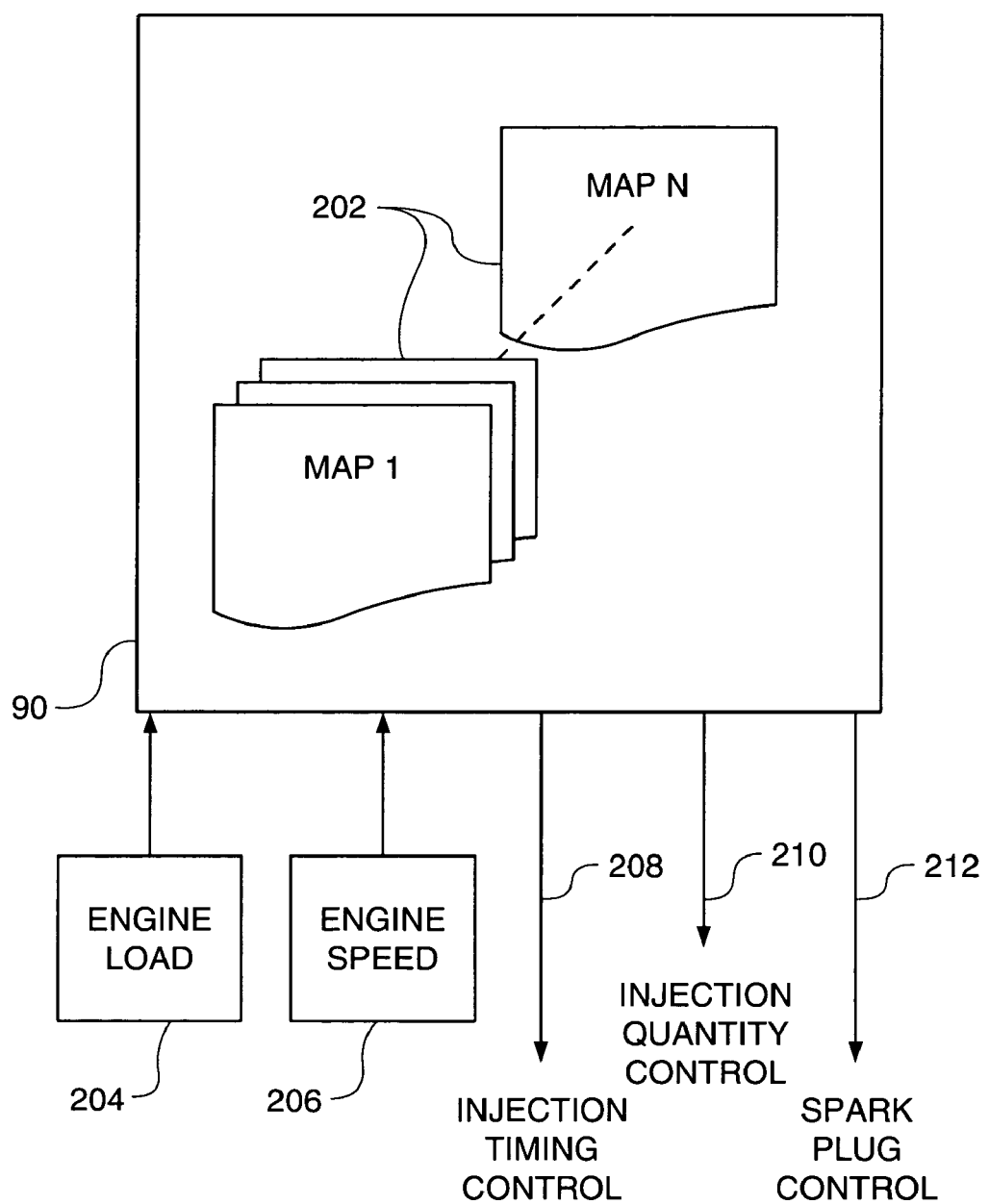

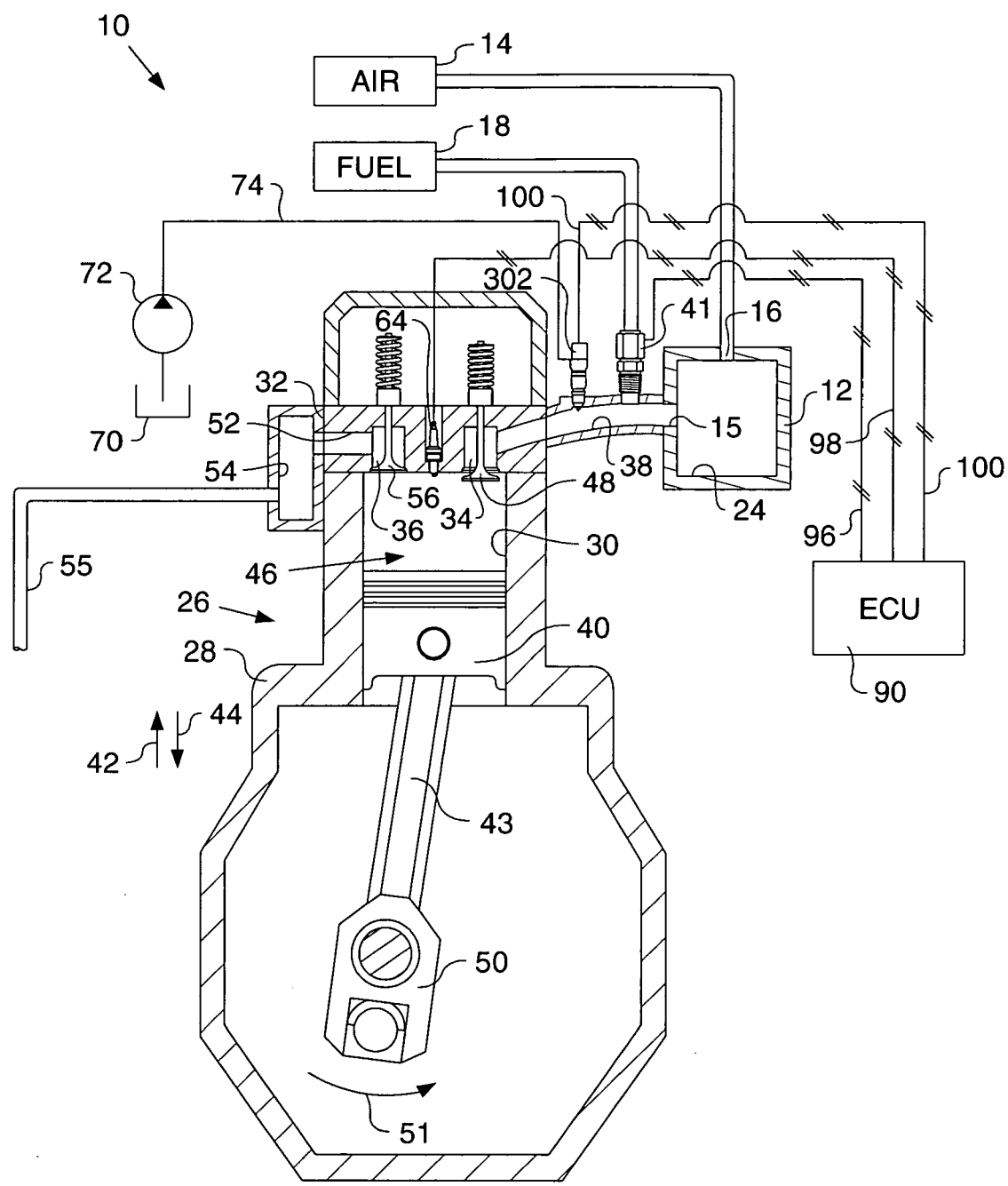
Fig_3_

DISTRIBUTED IGNITION METHOD AND APPARATUS FOR A COMBUSTION ENGINE

GOVERNMENT RIGHTS

This invention was made with Government support under DE-FC26-01CH11079 awarded by the Department of Energy. The Government has certain rights in this invention.

TECHNICAL FIELD

This disclosure relates generally to a method and apparatus for providing distributed ignition of a combustion engine and, more particularly, to a method and apparatus for controlling the ignition of a pilot fuel and primary fuel in a main combustion chamber of a combustion engine.

BACKGROUND

Low cetane, i.e., high octane, fuels, such as natural gas, have several advantages over other hydrocarbon fuels that are combusted in internal combustion engines. For example, natural gas is less expensive relative to other hydrocarbon fuels. Moreover, natural gas burns cleaner during operation of the internal combustion engine relative to other hydrocarbon fuels. By burning cleaner, a reduced amount of combustion byproducts such as carbon monoxide, oxides of nitrogen, and hydrocarbons are released into the environment during engine operation. In addition, because lubricants of the internal combustion engine become contaminated with combustion byproducts over time, the production of a reduced amount of combustion byproducts results in less contamination, thereby increasing the useful life of the lubricants.

One type of internal combustion engine is an auto-ignite engine, such as a typical diesel engine. Diesel engines combust fuel by compressing a mixture of air and fuel to a point where the fuel is ignited by heat, which results from such compression. When natural gas is used as a fuel in an auto-ignite engine, the natural gas does not readily ignite as it is compressed. In order to overcome this problem, an ignition source is provided to ignite the natural gas, such as a spark plug. In other types of engines, e.g., dual fuel engines, the ignition source is provided by injecting a small amount of pilot fuel, such as diesel fuel, into a mixture of air and natural gas (or other non-auto-igniting fuel). As the mixture of air, natural gas, and pilot fuel is compressed, the pilot fuel ignites, which in turn provides an auto-type ignition of the natural gas.

A disadvantage associated with using pilot fuel as an ignition source is the resulting generation of an increased amount of oxides of nitrogen ($NO_x$). In particular, the ratio of air to the combination of natural gas and pilot fuel in the combustion chamber varies with the proximity to the injected streams of pilot fuel. Rich mixtures are created near the location of injection of pilot fuel, while lean mixtures are created further away from the location of the injection. Combustion of the rich mixtures tends to produce more $NO_x$ than does the combustion of the lean mixtures.

One way to reduce the amount of $NO_x$ produced during the combustion process is to create a lean homogeneous mixture of air, natural gas, and pilot fuel throughout the combustion chamber prior to ignition. Because the homogeneous mixture is lean throughout the entire combustion chamber, only lean mixtures are combusted. Combustion of only lean mixtures produces a lesser quantity of $NO_x$ than does combustion of a combination of rich mixtures and lean mixtures. Once ignition is desired, a spark plug may be used to ignite the lean homogeneous mixture.

In commonly-owned U.S. Pat. No. 6,666,185 to Willi et al. ("Willi"), Willi discloses a method and apparatus for controlling the injection of pilot fuel to control ignition of a homogenous distribution of fuel in the engine. The method and apparatus of Willi comprises adjusting the injection timing and quantity of pilot fuel to control ignition as a function of engine load. In Willi, the fuel is auto-ignited.

In the present disclosure, a method and apparatus for controlling ignition of a homogenous distribution of pilot fuel and primary fuel using a spark plug is provided.

SUMMARY

In one aspect, a method for operating an internal combustion engine is disclosed. The method comprises the steps of introducing a primary fuel into a main combustion chamber of the engine, introducing a pilot fuel into the main combustion chamber of the engine, determining an operating load of the engine, determining a desired spark plug ignition timing based on the engine operating load, and igniting the primary fuel and pilot fuel with a spark plug at the desired spark plug ignition timing. The method is characterized in that the octane number of the pilot fuel is lower than the octane number of the primary fuel.

In another aspect, a method for providing distributed ignition of a combustion engine is provided. The method comprises the steps of introducing a quantity of fuel/air mixture into a combustion chamber of the engine, determining an operating load of the engine, determining a desired spark ignition timing based on the engine operating load, and igniting a spark plug to ignite the fuel/air mixture at the desired time.

In yet another aspect, a distributed ignition engine is provided. The engine comprises a cylinder assembly, which comprises an engine block having a piston cylinder defined therein, an engine head secured to the engine block, and a piston that translates within the piston cylinder, wherein the engine block, the engine head, and the piston cooperate to define a combustion chamber. The engine further comprises an intake port positioned in fluid communication with the combustion chamber during intake of a primary fuel and air mixture, a fuel injector operable to inject a pilot fuel for introduction into the combustion chamber of the engine, a spark plug configured to ignite the primary fuel and pilot fuel within the combustion chamber, an engine load determining device; and a controller configured to receive information from the engine load determining device and configured to responsively determine a desired spark plug ignition timing based on a desired homogeneous distribution of the pilot fuel within the combustion chamber.

BRIEF DESCRIPTION OF THE DRAWINGS

FIG. 1 is a partial cross sectional, partial schematic view of a combustion engine which incorporates the features of the present disclosure;

FIG. 2 is a block diagram illustrating an embodiment of the present disclosure; and FIG. 3 is a partial cross sectional, partial schematic view of a combustion engine, which incorporates features of an example of the present disclosure.

DETAILED DESCRIPTION

Referring to FIG. 1, there is shown an engine assembly 10. The engine assembly 10 includes a plenum member 12, and an air source 14. The plenum member 12 has an inlet opening 16, and an exit opening 15 defined therein. The air source 14 supplies air to the inlet opening 16. Air from the air source 14 advances into a plenum chamber 24 defined in the plenum member 12 via the inlet opening 16.

The engine assembly 10 further includes a cylinder assembly 26. The cylinder assembly 26 includes a block 28 having a piston cylinder 30 defined therein. An engine head 32 is secured to the block 28. The engine head 32 has an intake port 34, an exhaust port 36, and a fuel injector opening 60 defined therein. An intake conduit 38 places the intake port 34 in fluid communication with the exit opening 15 of the plenum member 12. An exhaust passage 52 places the exhaust port 36 in fluid communication with an exhaust manifold 54.

The engine assembly 10 further includes a piston 40, which translates in the piston cylinder 30 in the general direction of arrows 42 and 44. As the piston 40 moves downwardly in the general direction of arrow 44 to the position shown in FIG. 1, a connecting rod 43 urges a crankshaft 50 to rotate in the general direction of arrow 51. Subsequently, as the crankshaft 50 continues to rotate in the general direction of arrow 51, the crankshaft 50 urges the connecting rod 43 and the piston 40 in the general direction of arrow 42 to return the piston 40 to the uppermost position (not shown).

The piston 40, the piston cylinder 30, and the engine head 32 cooperate so as to define a combustion chamber 46. In particular, when the piston 40 is advanced in the general direction of arrow 42, the volume of the combustion chamber 46 is decreased. On the other hand, when the piston 40 is advanced in the general direction of arrow 44, the volume of the combustion chamber 46 is increased as shown in FIG. 1.

The engine assembly 10 further includes a primary fuel source 18 in fluid communication with the intake conduit 38. A primary fuel supply valve 41 controls the amount of primary fuel, such as natural gas, advanced to the intake conduit 38. In particular, the primary fuel supply valve 41 moves between an open position, which advances primary fuel to the intake conduit 38, and a closed position, which prevents advancement of primary fuel to the intake conduit 38. It should be appreciated that the amount of primary fuel advanced by the primary fuel valve 41 controls the ratio of air to primary fuel, or air/fuel ratio, advanced to the combustion chamber 46. Specifically, if it is desired to advance a leaner mixture to the combustion chamber 46, a primary fuel control signal received via a signal line 96 causes the primary fuel supply valve 41 to operate so as to advance less primary fuel to the intake conduit 38. On the other hand, if it is desired to advance a richer mixture of air and primary fuel to the combustion chamber 46, a primary fuel control signal received via the signal line 96 causes the primary fuel supply valve 41 to operate so as to advance more primary fuel to the intake conduit 38.

It is noted that other methods of introducing the primary fuel and air mixture to the combustion chamber 46 may be used without deviating from the spirit and scope of the present disclosure. For example, the primary fuel may be mixed with air at any point from the air source 14 through the intake conduit 38, including upstream of a turbocharger (not shown). Alternatively, the primary fuel may be injected directly into the combustion chamber 46, and subsequently mixed with the intake of air.

The primary fuel is typically a fuel having a high octane number, i.e., low cetane number. Preferably, the primary fuel is natural gas. However, the primary fuel may be of some other type, such as gasoline, methanol, ethanol, and the like, and may be either gaseous or liquid.

The engine assembly 10 further comprises a spark plug 64, configured to ignite the primary fuel, pilot fuel, and air mixture within the combustion chamber. Spark plug 64 enables engine assembly 10 to precisely control ignition of the fuel and air mixture, even during very lean fuel ratios. Ignition of spark plug 64 allows for precise control of combustion in a distributed ignition engine at low equivalence ratios, such as 0.5 and below. It should be appreciated that any type of spark plug may be used, such as a J-gap, multi-torch, pre-chamber, or laser, for example. It should also be appreciated that even a micro-pilot fuel injector, which auto-ignites the fuel in the absence of a spark, may be used.

In the embodiment shown in FIGS. 1 and 3, controller 90 sends a control signal 98 to spark plug 64 to precisely control ignition of the fuel and air mixture within combustion chamber 46.

An intake valve 48 selectively places the plenum chamber 24 in fluid communication with the combustion chamber 46. The intake valve 48 is actuated in a known manner by a camshaft (not shown), a pushrod (not shown), a rocker arm (not shown) driven by rotation of the crankshaft 50, or any valve actuation system that may be operated hydraulically, electronically, or pneumatically, for example. When the intake valve 48 is placed in the open position (shown in FIG. 1), air and primary fuel are advanced from the intake conduit 38 to the combustion chamber 46 via the intake port 34. When the intake valve 48 is placed in the closed position (not shown), primary fuel and air are prevented from advancing from the intake conduit 38 to the combustion chamber 46 since the intake valve 48 blocks fluid flow through the intake port 34.

An exhaust valve 56 selectively places the exhaust manifold 54 in fluid communication with the combustion chamber 46. The exhaust valve 56 is actuated in a known manner by a camshaft (not shown), a pushrod (not shown), a rocker arm (not shown) driven by rotation of the crankshaft 50, or any valve actuation system that may be operated hydraulically, electronically, or pneumatically, for example. When the exhaust valve 56 is placed in the open position (not shown), exhaust gases are advanced from the combustion chamber 46 to the exhaust manifold 54 via a fluid path that includes the exhaust port 36 and the exhaust passage 52. From the exhaust manifold 54, exhaust gases are advanced to an exhaust conduit 55. When the exhaust valve 56 is placed in the closed position (shown in FIG. 1), exhaust gases are prevented from advancing from the combustion chamber 46 to the exhaust manifold 54 since the exhaust valve 56 blocks fluid flow through the exhaust port 36.

Combustion of the mixture of primary fuel and air in the combustion chamber 46 produces a number of exhaust gases. After the mixture of primary fuel and air is combusted in the combustion chamber 46, exhaust gases are advanced through the exhaust conduit 55. Included among the exhaust gases are quantities of oxides of nitrogen ("$NO_x$").

The engine assembly 10 further includes a fuel reservoir 70. A fuel pump 72 draws low pressure fuel from the fuel reservoir 70 and advances high pressure fuel to a fuel injector 62 via a fuel line 74. The fuel injector 62 is positioned in the injector opening 60 and is operable to inject a quantity of fuel into the combustion chamber 46 through the injector opening 60. In particular, the fuel injector 62 injects fuel into the combustion chamber 46 upon receipt of an injector control signal on a signal line 100. Furthermore, the fuel can be any one of the following groups of fuels: diesel fuel, crude oil, lubricating oil, or an emulsion of water and diesel fuel. More generally, the fuel may be any type of fuel that has a higher cetane number than the primary fuel, thus having the property of combusting more readily than the primary fuel.

In the embodiment shown in FIGS. 1 and 3, controller 90 sends a control signal 100 to injectors 62 and 302 to control the quantity of pilot fuel introduced into combustion chamber 46.

It should be appreciated that the pilot fuel may be introduced into the combustion chamber 46 in any known manner, and is not limited to being directly injected, as shown in FIG. 1. For example, the pilot fuel may be port injected, as depicted in FIG. 3, or it may be introduced via a fuel supply valve, similar to fuel supply valve 41.

The engine assembly 10 further includes a controller 90. The controller 90 is preferably a microprocessor-based engine control unit. As FIG. 2 illustrates, the controller 90 preferably includes a set of maps 202. Each map 202 is a three-dimensional map of fuel injection quantity, spark plug ignition timing, and $NO_x$ for a determined engine operating load. A change in engine load would result in a new map 202 being referenced. Furthermore, the changes in loads, and hence maps, are based on a determined constant engine speed. A change in engine speed would require reference to additional maps.

The engine speed is determined by an engine speed determining device 206, such as a speed sensor or some such device well known in the art. The engine load is determined by an engine load determining device 204. Examples of engine load determining devices include, but are not limited to, cylinder pressure transducers to measure work per cycle, estimation based on measurement of intake pressure and oxygen in the exhaust, and estimation based on measured fuel mass flow rate.

Referring to FIG. 3, an example of the present disclosure is shown. The embodiment of FIG. 3 differs from the embodiment of FIG. 1 in that the pilot fuel is introduced into the combustion chamber 46 by way of the intake port 34, rather than by means of direct injection. For example, a port injector 302 may inject pilot fuel into the intake conduit 38, as shown. Alternatively, other devices may be used to deliver the pilot fuel into the intake port 34, such as an acoustic atomizer, an air assisted injector, and the like. Alternatives to the above-discussed embodiment may include introducing the pilot fuel at some other location upstream of the intake conduit 38, for example upstream of the supply of primary fuel and air.

INDUSTRIAL APPLICABILITY

In operation, the typical engine assembly 10 operates in a four-stroke cycle, which includes an intake stroke, a compression stroke, a power stroke, and an exhaust stroke. Although the below discussion pertains specifically to a four-stroke engine, the principles of the present disclosure may apply as well to other types of engines, such as a two-stroke engine.

The first stroke is the intake stroke, during which the exhaust valve 56 is positioned in the closed position and the intake valve 48 is positioned in the open position as shown in FIG. 1. During the intake stroke, the piston 40 is advanced downwardly in the general direction of arrow 44 thereby creating a low pressure in the combustion chamber 46. This low pressure draws primary fuel and air from the intake conduit 38 downwardly into the combustion chamber 46 so as to form a homogeneous mixture of air and primary fuel in the combustion chamber 46.

At some point during either the intake or compression stroke, pilot fuel is injected into either the combustion chamber 46 or intake conduit 38 via injector 62. The pilot fuel is injected far enough in advance to allow sufficient time for the pilot fuel to form a homogeneous mixture with the primary fuel and air mixture in the combustion chamber 46.

Advancing to the compression stroke, the intake valve 48 and the exhaust valve 56 are both positioned in their respective closed positions. As the piston 40 moves upwardly in the general direction of arrow 42, it compresses primary fuel, pilot fuel, and air in the combustion chamber 46. At a time during the compression stroke, spark plug 64 ignites so as to ignite the relatively homogenous mixture of primary fuel, pilot fuel, and air. The controller 90 receives information from the engine load determining device 204 and the engine speed determining device 206 and responsively accesses a relevant map 202. The map 202 provides an indication of a desired spark plug ignition timing based on a desired reduced amount of $NO_x$ being exhausted. The controller 90 then delivers command signals via signal line 212, which in turn controls the spark plug ignition timing. The controller may also deliver command signals via signal lines 208 and 210, which control injection timing and injection quantity, respectively.

In addition to the reference maps, the controller 90 may determine the desired spark plug ignition timing, pilot fuel injection timing, and pilot fuel quantity by other methods. For example, the controller 90 may receive information from a cylinder pressure transducer (not shown) or information relevant to engine speed fluctuations and responsively determine a desired injection quantity based on combustion variability. Furthermore, the controller 90 may receive information relevant to cylinder pressure rise rate, e.g., from measurement of cylinder pressure or the use of a "knock" sensor (not shown), and responsively determine a desired spark plug ignition timing.

In the embodiment of FIG. 3, the pilot fuel is injected in the intake conduit 38. It may be determined by the above maps or alternative means that the desired injection quantity may be somewhere in the range of 0.5% to 1% of the total fuel introduced into the combustion chamber 46. It is noted, however, that these quantities are exemplary only and may differ in value.

Other aspects can be obtained from a study of the drawings, the disclosure, and the appended claims.

What is claimed is:

1. A distributed ignition engine, comprising:
   a cylinder assembly, comprising (1) an engine block having a piston cylinder defined therein, (2) an engine head secured to the engine block, and (3) a piston that translates within the piston cylinder, wherein the engine block, the engine head, and the piston cooperate to define a combustion chamber;
   an intake port positioned in fluid communication with the combustion chamber during intake of a primary fuel and air mixture;
   a fuel injector operable to inject a pilot fuel for introduction into the combustion chamber of the engine;
   a spark plug configured to ignite the primary fuel and pilot fuel within the combustion chamber;

an engine load determining device; and a controller configured to receive information from the engine load determining device and configured to responsively determine a desired spark plug ignition timing based on a desired homogeneous distribution of the pilot fuel within the combustion chamber.

2. The engine as claimed in claim 1, characterized in that the controller includes a map of spark ignition timing, pilot fuel quantity, and NOx for the determined engine load.

3. The engine as claimed in claim 1, characterized in that the fuel injector directly injects pilot fuel into the combustion chamber.

4. The engine as claimed in claim 1, characterized in that the fuel injector injects pilot fuel into an intake conduit.

5. The engine as claimed in claim 1, characterized in that the spark plug comprises a pre-chamber.

6. The engine as claimed in claim 1, characterized in that the primary fuel and air mixture is a mixture of natural gas and air and the pilot fuel is a fuel having a cetane number higher than natural gas.

7. The engine as claimed in claim 1, characterized in that the primary fuel is natural gas.

8. The engine as claimed in claim 1, characterized in that the primary fuel and air mixture is a mixture of natural gas and air.

9. The engine as claimed in claim 1, characterized in that the pilot fuel has a cetane number higher than a cetane number of the primary fuel and air mixture.

10. The engine as claimed in claim 1, characterized in that the pilot fuel is diesel.

11. A distributed ignition engine, comprising:

a cylinder assembly, comprising (1) an engine block having a piston cylinder defined therein, (2) an engine head secured to the engine block, and (3) a piston that translates within the piston cylinder, wherein the engine block, the engine head, and the piston cooperate to define a combustion chamber;

an intake port positioned in fluid communication with the combustion chamber during intake of a primary fuel and air mixture;

a fuel injector operable to inject a pilot fuel for introduction into the combustion chamber of the engine;

a micro-pilot injector configured to inject a secondary fuel into the combustion chamber, which auto-ignites at some point during the compression stroke, for igniting the primary fuel and pilot fuel;

an engine load determining device; and a controller configured to receive information from the engine load determining device and configured to responsively determine a desired spark plug ignition timing based on a desired homogeneous distribution of the pilot fuel within the combustion chamber.

12. The engine as claimed in claim 11, characterized in that the fuel injector is the micro-pilot injector and the pilot fuel is of the same type as the secondary fuel, wherein the pilot fuel is directly injected into the combustion chamber before the secondary fuel.

* * * * *